(12) United States Patent
Shestak et al.

(10) Patent No.: US 10,838,359 B2
(45) Date of Patent: Nov. 17, 2020

(54) HOLOGRAM REPRODUCING APPARATUS AND METHOD THEREOF

(71) Applicant: Samsung Electronics Co., Ltd., Suwon-si (KR)

(72) Inventors: Sergey Shestak, Seoul (KR); Dae-sik Kim, Suwon-si (KR); Seon-deok Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 15/869,732

(22) Filed: Jan. 12, 2018

(65) Prior Publication Data

US 2018/0341219 A1 Nov. 29, 2018

(30) Foreign Application Priority Data

May 23, 2017 (KR) .................. 10-2017-0063566

(51) Int. Cl.
  *G03H 1/02* (2006.01)
  *G02F 1/19* (2019.01)
  (Continued)

(52) U.S. Cl.
  CPC ............. *G03H 1/02* (2013.01); *G02F 1/1347* (2013.01); *G02F 1/133509* (2013.01);
  (Continued)

(58) Field of Classification Search
  CPC ................... G03H 1/02; G03H 1/2294; G03H 2001/0224; G03H 2001/2207;
  (Continued)

(56) References Cited

U.S. PATENT DOCUMENTS 6,654,156 B1 * 11/2003 Crossland ............ H04N 5/7458
  348/751
6,760,135 B1 7/2004 Payne et al.
  (Continued)

FOREIGN PATENT DOCUMENTS

KR 10-2008-0094053 A 10/2008

OTHER PUBLICATIONS

Myers "Introductory Solid State Physics, Second Edition" pp. 48-53 (Year: 1997).*
(Continued)

*Primary Examiner* — George G King
(74) *Attorney, Agent, or Firm* — Jefferson IP Law, LLP

(57) ABSTRACT

A hologram reproducing apparatus is provided that includes a display configured to display a hologram pattern and emit a write beam corresponding thereto, a relay lens disposed at a front surface of the display and comprising an array of microlenses each focusing the write beam, a spatial light modulator (SLM) disposed at a front surface of the relay lens, configured to write the hologram pattern according to the focused write beam and modulate a reproduction beam into a plurality of diffraction beams if the reproduction beam is incident, a light guide plate disposed between the relay lens and the SLM and configured to guide the reproduction beam toward the SLM, a filter disposed at a front surface of the SLM and configured to filter the plurality of diffraction beams and the write beam, and a lens configured to focus the plurality of diffraction beams filtered through the filter.

18 Claims, 10 Drawing Sheets

(51) Int. Cl.
*G02F 1/1335* (2006.01)
*G03H 1/22* (2006.01)
*G02F 1/1347* (2006.01)

(52) U.S. Cl.
CPC .. *G02F 1/133526* (2013.01); *G02F 1/133528* (2013.01); *G02F 1/19* (2013.01); *G03H 1/2294* (2013.01); *G02F 2203/12* (2013.01); *G02F 2203/22* (2013.01); *G03H 2001/0224* (2013.01); *G03H 2001/221* (2013.01); *G03H 2001/2207* (2013.01); *G03H 2223/19* (2013.01); *G03H 2225/25* (2013.01)

(58) Field of Classification Search
CPC ......... G03H 2001/221; G03H 2223/19; G03H 2225/25; G02F 1/133509; G02F 1/133526; G02F 1/133528; G02F 1/1347; G02F 1/19; G02F 2203/12; G02F 2203/22

See application file for complete search history.

(56) References Cited

U.S. PATENT DOCUMENTS

| | | | |
|---|---|---|---|
| 6,927,748 B2 | 8/2005 | Hughes et al. | |
| 6,970,288 B2 | 11/2005 | Ebina et al. | |
| 8,400,695 B2 | 3/2013 | Kroll et al. | |
| 9,158,279 B2 | 10/2015 | Lee et al. | |
| 2004/0196524 A1* | 10/2004 | Hughes | G02F 1/1347 359/244 |
| 2006/0139759 A1 | 6/2006 | Hashimoto et al. | |
| 2011/0122467 A1 | 5/2011 | Futterer et al. | |
| 2012/0086994 A1* | 4/2012 | Choi | G03H 1/2294 359/9 |
| 2014/0375763 A1* | 12/2014 | Lee | G03H 1/02 348/40 |

OTHER PUBLICATIONS

Berlich et al., Multi-Aperture Microoptical System for Close-Up Imaging, Current Developments in Lens Design and Optical Engineering XV, Proc. of SPIE vol. 9192 91920E-1 (2014).

Pyun et al., Compact Holographic Printer Using RGB Waveguide Holographic Optical Elements, MOEMS and Miniaturized Systems XII, Proc. of SPIE vol. 8616, 86160R (2013).

Shrestha et al., A High-Resolution Optically Addressed Spatial Light Modulator Based on ZnO Nanoparticles, Light: Science & Applications 4, e259 (2015).

* cited by examiner

HOLOGRAM REPRODUCING APPARATUS AND METHOD THEREOF

CROSS-REFERENCE TO RELATED APPLICATION(S)

This application claims the benefit under 35 U.S.C. § 119(a) of a Korean patent application filed on May 23, 2017 in the Korean Intellectual Property Office and assigned Serial number 10-2017-0063566, the entire disclosure of which is hereby incorporated by reference.

TECHNICAL FIELD

The present disclosure relates to a hologram reproducing apparatus and a control method thereof. More particularly, the present disclosure relates to a hologram reproducing apparatus provided with a spatial light modulator (SLM) and a control method thereof.

BACKGROUND

In accordance with a recent development of three dimensional (3D) display technology, 3D images are used in various industrial fields. Particularly, research on holograms that reproduce objects in an actual manner is actively carried out and at the same time, contents using holograms are being produced in various fields such as broadcasting, exhibition, and performance.

A hologram reproduces an object using a phenomenon of coherence of light. If a computer-generated hologram (CGH) pattern generated using a computer is provided to a spatial light modulator (SLM), the SLM generates a holographic image by diffracting a reproduction beam.

A viewing angle, resolution, etc. for the holographic image are determined by a pixel pitch of the SLM. Currently, commercialized SLM products with the pixel pitch of 1 μm or less are few, and accordingly only a holographic image of a limited viewing angle and a low resolution may be provided.

Thus, there has been developed an optically addressed SLM that is not affected by the pixel pitch and records and reproduces the CGH pattern by light.

However, an optically addressed SLM of the related art has been implemented only with a large bulky shape including a plurality of lens arrays and the like and may not effectively block a zero order diffraction beam, which causes a problem in generating cross talk between a plurality of diffraction beams.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hologram reproducing apparatus that may reduce a size of the hologram reproducing apparatus and provide a high-quality holographic image and a control method thereof.

In accordance with an aspect of the present disclosure, a hologram reproducing apparatus is provided. The hologram reproducing apparatus includes a display configured to display a hologram pattern and emit a write beam corresponding to the hologram pattern, a first lens unit disposed at a front surface of the display and including at least one lens array including a plurality of first microlenses for firstly focusing the write beam emitted from the display, a second lens unit including at least one lens array including a plurality of second microlenses for secondarily focusing the write beam diffused after being firstly focused, a spatial light modulator (SLM) disposed at a front surface of the second lens unit, configured to write the hologram pattern according to the secondly focused write beam, if a reproduction beam is incident, and modulate the reproduction beam into a plurality of diffraction beams corresponding to the hologram pattern, a light guide plate configured to guide the reproduction beam toward the SLM, a filter disposed at a front surface of the SLM and configured to filter the plurality of diffraction beams and the write beam, and a lens configured to focus the plurality of diffraction beams filtered through the filter.

The first lens unit may include a first lens array disposed at the front surface of the display at a first interval from the display, and a second lens array disposed at a front surface of the first lens array at a second interval from the first lens array, the second lens unit may include a third lens array disposed at a front surface of the second lens array, and a fourth lens array disposed at a front surface of the third lens array at the second interval from the third lens array, the fourth lens array may be arranged at the first interval from the SLM, and the first interval may be greater than the second interval.

Microlenses included in each of the first and fourth lens arrays may have a first focal distance, microlenses included in each of the second and third lens arrays may have a second focal distance, and the first focal distance may be greater than twice the second focal distance.

The first interval may have an interval greater than twice the first focal distance, and the second interval may have an interval less than twice the first focal distance.

The SLM may include a photosensitive layer configured to write the hologram pattern according to the write beam, and a liquid crystal display (LCD) panel disposed at a front surface of the photosensitive layer to modulate the incident reproduction beam into a plurality of diffraction beams corresponding to the hologram pattern.

The light guide plate may be disposed between the second lens unit and the SLM.

The light guide plate may include an expander configured to collimate the reproduction beam to make the reproduction beam uniformly incident on a rear surface of the SLM, and an in-coupling element disposed at one side of the expander to allow an incidence angle of the reproduction beam incident on the expander to fall within a predetermined angle range, and the in-coupling element may be implemented as a Bragg grating element or a prism.

The light guide plate may include an expander configured to collimate the reproduction beam to make the reproduction beam uniformly incident on a rear surface of the SLM, and an out-coupling element disposed at a front surface of the expander to refract the reproduction beam incident on the expander at a predetermined angle and emit the reproduction beam outside of the expander, and the out-coupling element may be implemented as a Bragg grating element.

The out-coupling element may refract and emit the reproduction beam incident on the expander at the predetermined angle based on an equation, $$n\lambda = 2d \sin(\theta)$$

where n denotes a refractive index of the Bragg grating, λ denotes a wavelength of a reproduction beam, and d denotes a distance between the Bragg grating.

The filter may include a Bragg grating filter, if the plurality of diffraction beams are incident, the Bragg grating filter may allow a diffraction beam incident within a predetermined angle range to pass through based on a zero order diffraction beam among the plurality of diffraction beams, and the zero order diffraction beam may be a beam in which the reproduction beam is not modulated to a diffraction beam in the SLM.

The filter may further include a louver film disposed at a front surface of the Bragg grating filter to secondarily filter the diffraction beam firstly filtered through the Bragg grating filter.

The hologram reproducing apparatus may further include a first polarizing filter disposed between the display and the first lens unit to filter a first polarizing component of the write beam, and the filter may further include a second polarizing filter configured to filter a second polarizing component of the write beam.

The display may be implemented as a self-luminous element that emits the write beam corresponding to the hologram pattern.

In accordance with another aspect of the present disclosure, a control method of a hologram reproducing apparatus is provided. The control method includes a display configured to display a hologram pattern and emit a write beam corresponding to the hologram pattern, a first lens unit disposed at a front surface of the display and including at least one lens array including a plurality of first microlenses for each firstly focusing the write beam emitted from the display, and a second lens unit including at least one lens array including a plurality of second microlenses for secondarily focusing the write beam diffused after being firstly focused includes transmitting the write beam emitted from the display to a SLM through the first lens unit and the second lens unit, writing a hologram pattern corresponding to the write beam by the SLM, modulating a reproduction beam incident on the SLM into a plurality of diffraction beams corresponding to the hologram pattern, filtering the plurality of diffraction beams and the write beam by a filter disposed at a front surface of the SLM, and focusing the diffraction beam filtered by the lens disposed at a front surface of the filter.

The first lens unit may include a first lens array disposed at the front surface of the display at a first interval from the display, and a second lens array disposed at a front surface of the first lens array at a second interval from the first lens array, the second lens unit may include a third lens array disposed at a front surface of the second lens array, and a fourth lens array disposed at a front surface of the third lens array at the second interval from the third lens array, the fourth lens array may be arranged at the first interval from the SLM, and the first interval may be greater than the second interval.

Microlenses included in each of the first and fourth lens arrays may have a first focal distance, microlenses included in each of the second and third lens arrays may have a second focal distance, and the first focal distance may be greater than twice the second focal distance.

The first interval may have an interval greater than twice the first focal distance, and the second interval may have an interval less than twice the first focal distance.

The SLM may include a photosensitive layer configured to write a hologram pattern according to the write beam, and a LCD panel disposed at a front surface of the photosensitive layer to modulate the incident reproduction beam into a plurality of diffraction beams corresponding to the hologram pattern.

The reproduction beam may be guided toward the SLM by the light guide plate disposed between the second lens unit and the SLM.

The light guide plate may include an expander and an out-coupling element, and the control method may further include collimating the reproduction beam by the expander to make the reproduction beam uniformly incident on a rear surface of the SLM, and refracting the reproduction beam incident on the expander by the out-coupling element disposed at the rear surface of the expander at a predetermined angle and emitting the reproduction beam outside of the expander.

As described above, according to various embodiments of the present disclosure, the hologram reproducing apparatus may be miniaturized and may provide a high-quality holographic image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
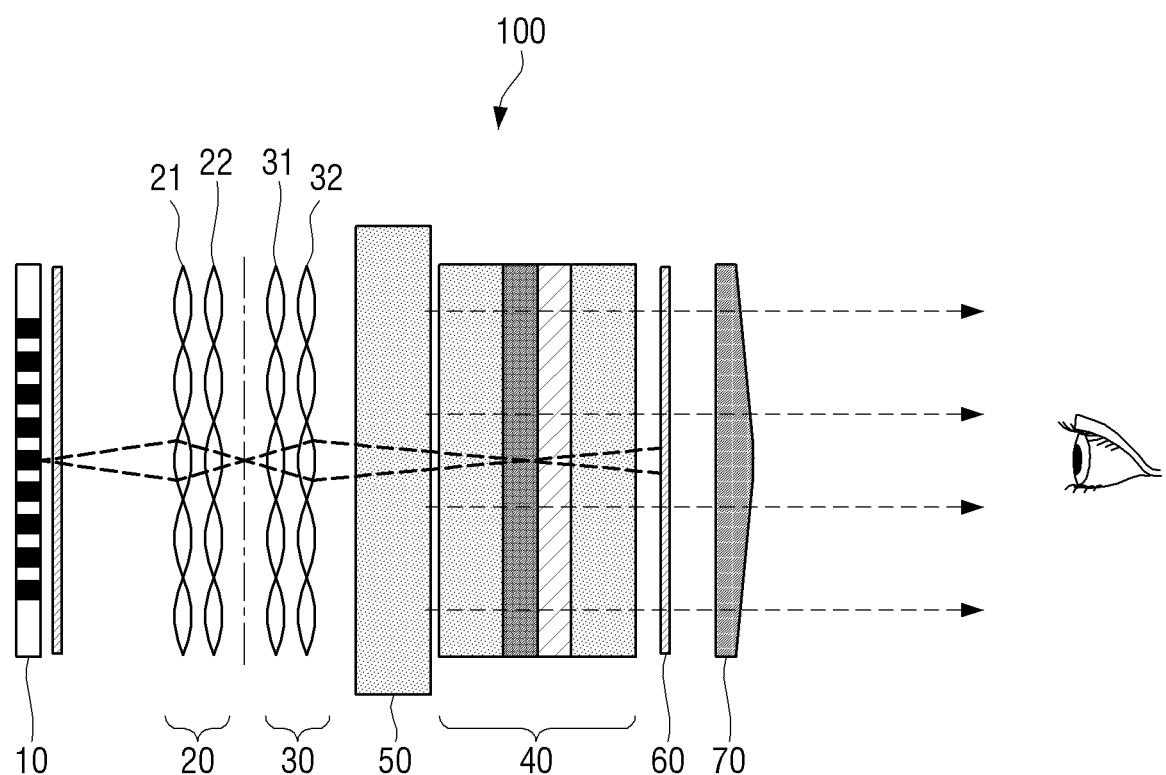
FIG. 1 is a diagram for explaining a hologram reproducing apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, to "include" an element means that it may include other elements, rather than excluding other elements, unless specifically stated otherwise. Further, various elements and regions in the drawings are schematically drawn. Accordingly, the technical spirit of the present disclosure is not limited by the relative size or spacing depicted in the accompanying drawings.

FIG. 1 is a diagram for explaining a hologram reproducing apparatus 100 according to an embodiment of the present disclosure.

Referring to FIG. 1, the hologram reproducing apparatus 100 based on a spatial light modulator (SLM) may include a display 10, a first lens unit 20, a second lens unit 30, a SLM 40, a light guide plate 50, a filter 60, and a lens 70.

The display 10 displays a hologram pattern. The hologram reproducing apparatus 100 may be connected to a computer apparatus (not shown) by wired or wirelessly to receive information on the hologram pattern, and may display the hologram pattern through the display 10 according to an embodiment. For example, a computer apparatus (not shown) may generate a computer-generated hologram (CGH) pattern through CGH processing on an input image and transmit the CGH pattern to the hologram reproducing apparatus 100. A CGH pattern received from an external server or the like may be stored in the hologram reproducing apparatus 100 according to another embodiment. According to another embodiment, when the hologram reproducing apparatus 100 has a computing function, the hologram reproducing apparatus 100 may directly generate a CGH pattern. However, it is needless to say that the hologram pattern is not limited to the CGH pattern generated through CGH processing, and may include stereoscopic information about an object generated by using various apparatuses such as a coherence pattern generated using laser light.

The display 10 may emit a write beam corresponding to the displayed hologram pattern.

The display 10 according to an embodiment of the present disclosure may be implemented as a micro display. When the display 10 is implemented as a display requiring a separate light source such as an LCD, a light source unit (e.g., a backlight) provided inside or outside the display 10 may irradiate a coherence light source to the display 10, and the irradiated light source may be emitted as a write beam corresponding to the hologram pattern.

According to another embodiment, the display 10 may be implemented as a self-luminous element which is turned on/off in units of pixels in accordance with a hologram pattern, and may emit the write beam by itself. For example, the self-luminous element may be implemented as an organic light-emitting diode (OLED), active-matrix organic light-emitting Diode (AMOLED), etc., but is not limited thereto. The display 10 may be implemented by various types of display devices that emit the write beam corresponding to the hologram pattern.

The write beam emitted from the display 10, that is, the write beam corresponding to the hologram pattern, may be incident on the SLM 40 through the first and second lens units 20 and 30. Here, the first lens unit 20 may include at least one lens array composed of a plurality of first microlenses for firstly focusing write beams emitted from the display 10 respectively. The second lens unit 30 may include at least one lens array composed of a plurality of second microlenses for secondarily focusing the write beams diffused after being firstly focused.

According to an embodiment, the first lens unit 20 may include at least two lens arrays. The write beams emitted and spread out (or diffused) from the display 10 may be firstly focused by the first lens unit 20. When the second lens array 22 is disposed at a distance less than twice a focal distance (F-distance) of the plurality of microlenses included in the first lens array 21 among the first lens array 21 and the second lens array 22 included in the first lens unit 20, the write beam that has passed through the first lens array 21 may be focused by the second lens array 22. Since the hologram pattern displayed on the display 10 is reversed, it is necessary to again reverse the write beam firstly focused by the second lens array 22 through the second lens unit 30.

The write beam diffused after being firstly focused by the first lens unit 20 may pass through the second lens unit 30, may be reversed again, and may be incident on the SLM 40.

The second lens unit 30 may include at least two lens arrays. The write beam diffused after being firstly focused passes through a third lens array 31 and a fourth lens array 32 included in the second lens unit 30 and then is secondly focused. The secondly focused write beam has the same direction as the hologram pattern displayed on the display 10. If the secondarily focused write beam is incident on the SLM 40, the SLM 40 may write the hologram pattern.

The plurality of microlenses included in the first lens unit 20 and the second lens unit 30 may correspond to each other on a one-to-one basis. The first lens unit 20 and the second lens unit 30 may be spaced apart from each other at predetermined intervals based on a predetermined reference. Also, at least one lens array included in the first lens unit 20 and at least one lens array included in the second lens unit 30 may be spaced apart at predetermined intervals based on a predetermined reference.

Structures of the first lens unit 20 and the second lens unit 30 and an arrangement method of the plurality of lens arrays will be described in detail with reference to FIGS. 2A and 2B.

The SLM 40 spatial modulates an incident reproduction beam to reproduce a holographic three-dimensional image.

The SLM 40 may be implemented by including at least one of a liquid crystal display (LCD) based SLM, a liquid crystal on silicon (LCoS) SLM, a dot-matrix display (DMD) SLM, and an optically addressed SLM. However, since the DMD SLM, the LCoS SLM, and the like have a pixel-based minimum unit, the hologram pattern is written and reproduced in units of pixels. In this case, since a pixel size and a distance between pixels, that is, a pixel pitch, are limitedly reduced, a pixel-based SLM may only provide a holographic image with a very narrow viewing angle. Therefore, it is described on the assumption that the SLM according to various embodiments of the present disclosure is implemented as an optically addressed SLM that writes and reproduces a hologram pattern by light, not a pixel.

When the write beam emitted from the display 10 passes through the first and second lens units 20 and 30 and then is incident on the SLM 40, the SLM 40 according to an embodiment of the present disclosure may write the hologram pattern corresponding to the write beam. Specifically, the SLM 40 is optically addressed by the write beam, and may generate a photocurrent at a portion irradiated with the write beam. When the photocurrent is generated, a liquid crystal arrangement inside the SLM 40 may be changed. Since the liquid crystal array is changed corresponding to the write beam, the SLM 40 may implement the hologram pattern.

Further, when a reproduction beam is incident on the SLM 40, the SLM 40 may modulate the reproduction beam into a plurality of diffraction beams corresponding to the hologram pattern. As described above, if the reproduction beam is incident in a state in which the liquid crystal array is changed, the reproduction beam irradiated on the liquid crystal inside the SLM 40 may be modulated into the plurality of diffraction beams. Here, the reproduction beam is a beam for reproducing a holographic three-dimensional image corresponding to the hologram pattern implemented in the SLM 40, and is also referred to as a reconstruction beam and a read beam.

The light guide plate 50 is configured to guide a reproduction beam emitted from a reproduction beam provider (not shown) provided on one side of the light guide plate 50 and incident on the light guide plate 50 toward the SLM 40, and may be disposed between the second lens unit 30 and the SLM 40. Meanwhile, a structure of the light guide plate 50 will be described in detail with reference to FIGS. 4, 5, and 7A to 7D.

The filter 60 is configured to filter a plurality of diffraction beams and a write beam and may be disposed at a front surface of the SLM 40. The filter 60 may include at least one of a Bragg grating filter, a polarizing filter, and a louver filter. Here, the Bragg grating filter may allow a diffraction beam incident within a predetermined angle range to pass through among on the plurality of diffraction beams based on a Bragg diffraction condition (Bragg selectivity). Here, the predetermined beam may be a zero order diffraction beam in which a reproduction beam is not modulated into a diffraction beam in the SLM 40.

The polarizing filter is a filter that allows only a specific polarizing light component to pass through among a plurality of polarizing light components included in a light source, reflects remaining polarizing light components, and allows the light source to selectively pass through and reflect. For example, a first polarizing filter may be disposed between the display 10 and the first lens unit 20 to filter a first polarizing light component of the write beam and pass through only a second polarizing light component. In this case, a second polarizing filter may be disposed at the front surface of the SLM 40 to filter the second polarizing light component of the write beam. When the write beam is provided to a viewing area of a user, since the write beam may damage the user's eyes or obstruct generation of the holographic three-dimensional image, the first and second polarizing components included in the write beam are respectively filtered by the first polarizing filter and the second polarizing filter, thereby preventing the write beam from being provided to the viewing area of the user.

Further, the louver filter may be implemented as a sheet or a film having a light absorbing or shielding horizontal louver image structure. For example, the filter 60 includes the Bragg grating filter and the louver filter, and may be implemented to allow the louver filter to secondarily filter a diffraction beam firstly filtered through the Bragg grating filter but is not limited thereto. The filter 60 may include at least one of the Bragg grating filter, the polarizing filter, and the louver filter described above to filter the plurality of diffraction beams and the write beam.

The lens 70 may be disposed at a front surface of the filter 60 to focus the diffraction beam that has passed through the filter 60 to the viewing area of the user. The lens 70 may be implemented as a fresnel lens, a positive lens, a convex lens, and a field lens to focus the diffraction beam that has passed through the filter 60 to a single spot. That is, if the diffraction beam is focused on the viewing area of the user, the user may view a holographic image.

Hereinafter, each configuration of the hologram reproducing apparatus 100 will be described in detail.

Figure 2A:
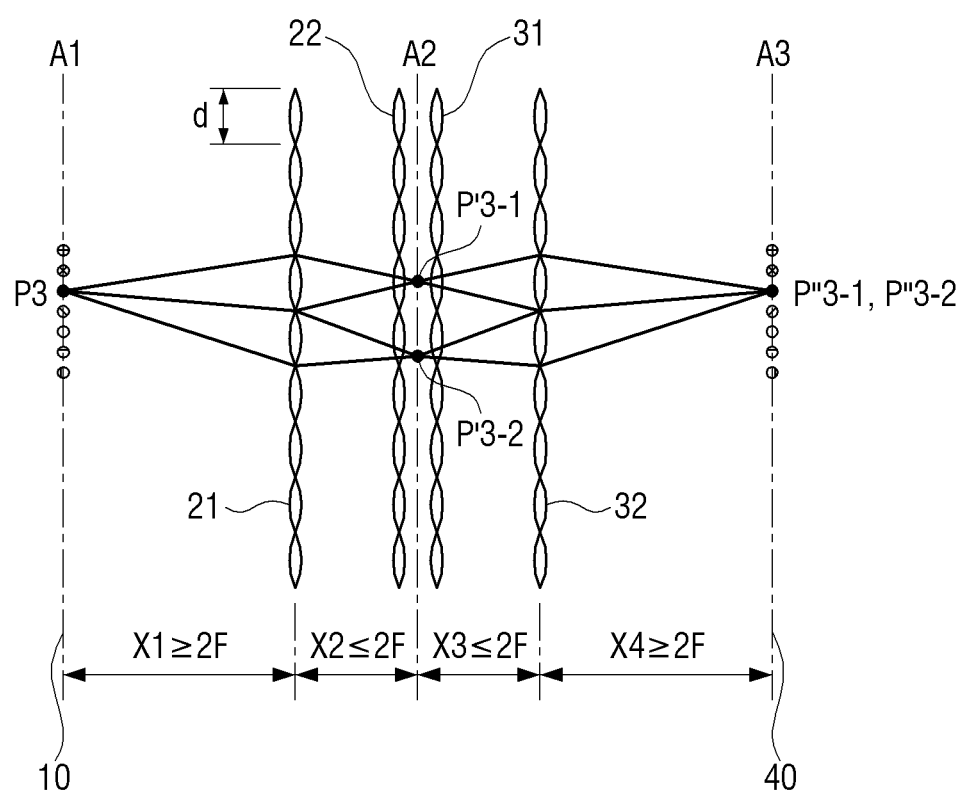
FIGS. 2A and 2B are diagrams for explaining a display, a first lens unit, and a second lens unit according to various embodiments of the present disclosure.
Figure 2B:
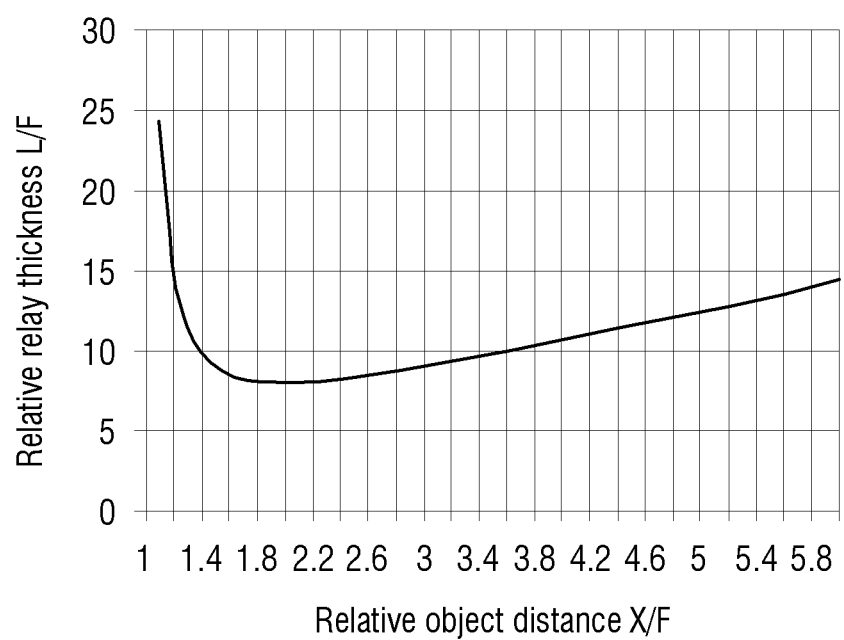

FIGS. 2A and 2B are diagrams for explaining the display 10, the first lens unit 20, and the second lens unit 30 according to various embodiment of the present disclosure.

The display 10 shown in FIG. 2A may display a hologram pattern as described above and emit a write beam corresponding to the hologram pattern. The write beam emitted from the display 10 may pass through the first lens unit 20 and may be firstly focused. For example, the first lens unit 20 may include the first lens array 21 and the second lens array 22 which are composed of a plurality of microlenses. In this case, the write beam may be firstly focused after sequentially passing through the first lens array 21 and the second lens array 22. However, the first lens unit 20 is not limited to the above-described configuration. The first lens unit 20 may include only the first lens array 21 composed of the plurality of microlenses to firstly focus the write beam, and may include two or more lens arrays to firstly focus the write beam.

The plurality of microlenses included in the first lens array 21 according to an embodiment of the present disclosure may be implemented to respectively correspond to the plurality of pixels included in the display 10 on a one-to-one basis. However, the plurality of microlenses included in the first lens array 21 are not limited thereto and may respectively focus write beams emitted from a plurality of pixels.

The write beam diffused after being firstly focused may pass through the second lens unit 30 and may be secondarily focused. For example, the second lens unit 30 may include a third lens array 31 and a fourth lens array 32, which are composed of a plurality of microlenses. In this case, the write beam diffused after being firstly focused may sequentially pass through the third lens unit 31 and the fourth lens unit 32 and may be secondarily focused. The SLM 40 may be disposed at a spot where the write beam is secondly focused so that the write beam is incident on the SLM 40. However, the second lens unit 30 described above may include a single lens array or two or more lens arrays to secondarily focus the write beam. For example, three lens arrays composed of microlenses having different focal distances may be sequentially arranged to secondarily focus the write beam diffused after being firstly focused. Hereinafter, for convenience of description, it is described on the assumption that the first lens unit 20 includes the first and second lens arrays 21 and 22 and the second lens unit 30 includes the third and fourth lens arrays 31 and 32.

The first lens unit 20 according to an embodiment of the present disclosure may include the first and second lens arrays 21 and 22. A plurality of microlenses included in each of the first lens array 21 and the second lens array 22 may correspond to each other on a one-to-one basis. That is, the number of microlenses included in the first lens array 21 and the number of microlenses included in the second lens array 22 may be the same but is not limited thereto. When the first lens array 21 and the second lens array 22 include different numbers of microlenses, the write beam that has passed through the first lens array 21 may pass through the second lens array 22 and may be firstly focused.

The write beam emitted from each pixel of the display 10 may be focused by the microlens included in the adjacent first lens array 21. On the other hand, the second lens array 22 may be spaced apart from the first lens array 21 by a distance less than twice a first focal distance of the microlenses included in the first lens array 21. In this case, the write beam may be focused onto a spot after passing through the first lens array 21 and the second lens array 22. For example, as shown in FIG. 2A, the write beam may be focused on an imaginary plane A2 disposed between the first lens unit 20 and the second lens unit 30. The write beam focused by the first lens unit 20 is in a state in which the hologram pattern displayed on the display 10 is reversed.

Since the write beam focused while being reversed must be again reversed in a forward direction, i.e., in the same direction as the hologram pattern displayed on the display 10, and incident on the SLM 40, the second lens unit 30 may be additionally disposed at a front surface of the first lens unit 20.

The write beam that has passed through the second lens array 22 included in the first lens unit 20 may be diffused after being firstly focused, may spread out after passing through the third lens array 31 included in the second lens unit 30, may be focused on a spot after passing through the fourth lens array 32 disposed at the front surface of the third lens array 31, and may be incident on the SLM 40. The microlenses included in each of the second lens array 22 and the third lens array 31 according to an embodiment of the present disclosure may be implemented as a field lens. Here, the field lens may be a lens for preventing the write beam from being spread out and damaged and focusing the write beam.

The first through fourth lens arrays 21, 22, 31, and 32 according to an embodiment of the present disclosure may be arranged on a predetermined reference. Specifically, the first lens array 21 disposed closest to the display 10 may be arranged to have a first interval, and the first lens array 21 and the second lens array 22 may be arranged to have a second interval. Also, the third lens array 31 and the fourth lens array 32 may be arranged to have a second interval and the fourth lens array 32 may be arranged to have the first interval with the SLM 40. Here, the first interval may be equal to or greater than the second interval. On the other hand, a third interval between the second lens array 22 and the third lens array 31 may be set such that the write beam is firstly focused on a virtual plane A2 arranged at a center of the second lens array 22 and the third lens array 31. That is, as shown in FIG. 2A, the first through fourth lens arrays 21, 22, 31, and 32 may be arranged symmetrically with respect to the imaginary plane A2.

According to an embodiment of the present disclosure, the microlenses included in the first and fourth lens arrays 21 and 32 have the same first focal distance (F-distance), and the microlenses included in the second and third lens arrays 22 and 31 may have the same second focal distance. Here, the first focal distance may be at least twice the second focal distance.

Since the write beam that has passed through the second lens array 22 and focused is in a reversed state, the second lens unit 30 may be arranged in a front surface of the first lens unit 20 to again reverse the write beam to be incident on the SLM 40. The second lens unit 30 may include the third and fourth lens arrays 31 and 32 according to an embodiment of the present disclosure. If the third and fourth lens arrays 31 and 32 are arranged symmetrically with respect to the imaginary plane A2 between the first lens unit 20 and the second lens unit 30, the microlenses included in the third lens array 31 may have the same focal distance as the microlenses included in the second lens array 22 and the microlenses included in the fourth lens array 32 may have the same focal distance as the microlenses included in the first lens array 21. Accordingly, the write beam emitted from the display 10 may sequentially pass through the first lens unit 20 and the second lens unit 30 and may be incident on the SLM 40, and the SLM 40 may write the hologram pattern corresponding to the write beam.

A F-number of the microlenses included in the first through fourth lens arrays 21, 22, 31, and 32 according to an embodiment of the present disclosure may be determined based on a predetermined reference. Here, the F-number of the microlens is a numerical value indicating an amount by which the microlens allows the write beam to pass through.

A diameter d of the microlenses included in the first lens array 21 may be determined based on a wavelength of the write beam and area (a pixel pitch) of one pixel included in the display 10. For example, the diameter d of the microlens may be set such that a ratio (d/f) of the focal distance f of the microlens and the diameter d of the microlens is equal to or larger than $(2*\lambda)/p$ as shown the following Equation 1, $$\frac{d}{f} > \frac{2\lambda}{p} \qquad \text{Equation 1}$$

wherein p denotes the pixel pitch, which is an area occupied by each of a plurality of pixels included in the display 10, λ denotes the wavelength of the write beam, f is the focal distance of the microlens, and d is the diameter of the microlens.

At least one of an aperture stop and a field stop may be disposed between the first to fourth lens arrays 21, 22, 31, and 32 according to an embodiment of the present disclosure. Here, the aperture stop and the field stop may each block a part of the write beam emitted and spread out from the display 10. For example, a first aperture stop may be disposed between the first and second lens arrays 21 and 22, and a second aperture stop may be disposed between the third and fourth lens arrays 31 and 32. Further, the field stop may be disposed between the second and third lens arrays 22 and 31. In this case, a part of the write beam spread out after passing through the first lens array 21 may be blocked by the first aperture stop. The remaining write beam is incident on the second lens array after passing through the first aperture stop. Subsequently, a part of the write beam that has passed through the second lens array 22 is limited by the field stop disposed between the second and third lens arrays 22 and 31, and the remaining write beam is incident on the third lens array 31. Subsequently, a part of the write beam that has passed through the third lens array 31 is limited by the second aperture stop disposed between the third and fourth lens arrays 31 and 32, and the remaining write beam may be incident on the SLM 40. On the other hand, an arrangement relationship of the aperture stop and the field stop is not limited to the above-described example. A part of the write beam variously disposed and spread out between the first to fourth lens arrays 21, 22, 31, and 32 may be blocked (or an amount of the write beam spread out may be limited). FIG. 2B is a graph for explaining a correlation between a focal distance of a microlens and an interval between lens arrays.

Referring to FIG. 2B, a variation of the interval between the lens arrays according to the focal distance of the microlens included in a lens array is illustrated.

An X-axis is a value obtained by dividing an interval between the display 10 and the first lens array 21, that is, a first interval X1, by the first focal distance F (X1/F).

A Y axis is a value obtained by dividing a distance (L=X1+X2+X3+X4) between the display 10 and the SLM 40 by the first focal distance F (L/F).

When the value of the X-axis is in the range of 1.8 and 2.2, the value of the Y-axis may be in the range of 5 and 10. For example, when X1=2F, the value of L/F is about 8. According to the graph shown in FIG. 2B, when the first interval is twice the first focal distance, the interval between the display 10 and the SLM 40 may be the shortest. Therefore, the display 10 and the first lens array 21 may be arranged at an interval twice the first focal distance of the microlenses included in the first lens array 21, and the fourth lens array 32 and the SLM 40 may also be disposed at the same interval (the first interval). Further, as described above, the first lens array 21 and the second lens array 22 may be arranged at an interval less than twice the first focal distance, and the second lens array 22 and the third lens array 31 may also be arranged at an interval less than twice the first focal distance. In this case, since the display 10 and the SLM 40 are disposed apart from each other by an interval less than 8 times (8F) the first focal distance, a size of the hologram reproducing apparatus 100 may become compact.

Figure 3:
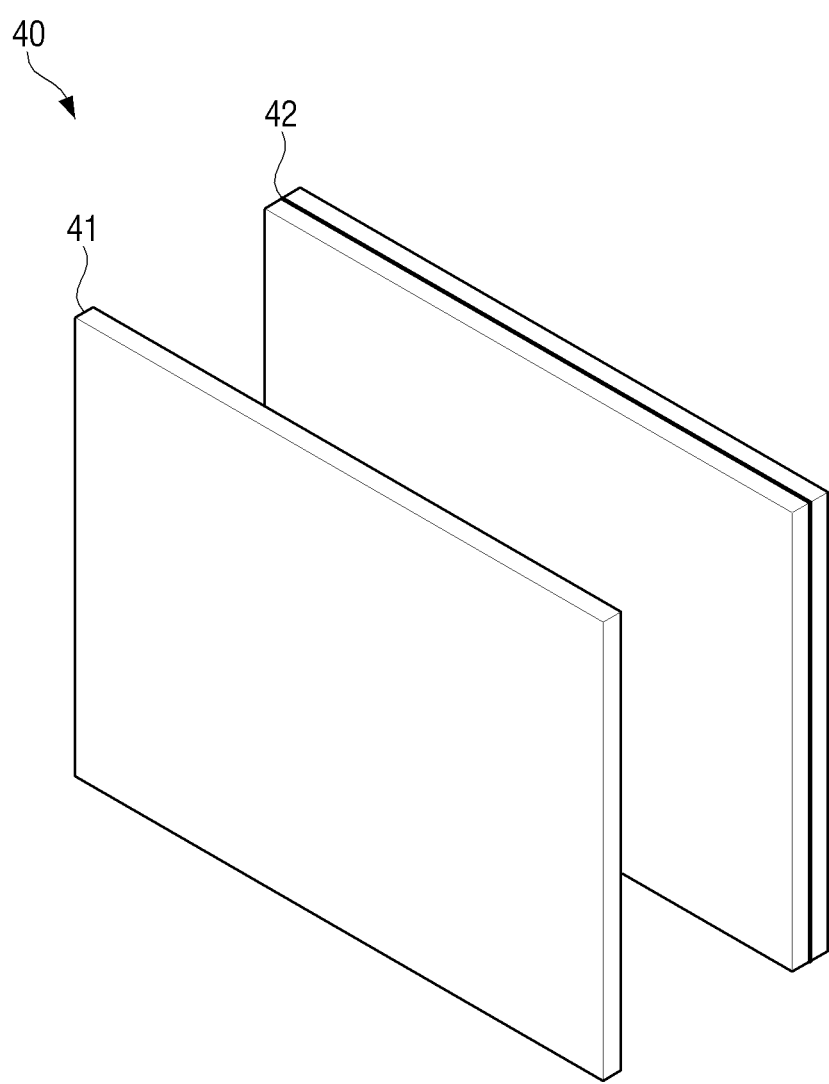
FIG. 3 is a diagram for explaining a configuration of a spatial light modulator (SLM) according to an embodiment of the present disclosure.

FIG. 3 is a diagram for explaining a configuration of the SLM 40 according to an embodiment of the present disclosure.

Referring to FIG. 3, the SLM 40 may include a photosensitive layer 41 and a LCD panel 42.

First, the photosensitive layer 41 may be implemented in the form of a layer including a photosensitive component sensitive to a UV beam or an IR beam. Also, the photosensitive layer 41 may be optically addressed by a write beam focused by the second lens unit 30 to generate a photocurrent at a portion irradiated with the write beam, and accordingly, the photocurrent may be generated in a region corresponding to a hologram pattern.

The LCD panel 42 is configured to modulate an incident reproduction beam into a plurality of diffraction beams corresponding to the hologram pattern and may be disposed at a front surface of the photosensitive layer 41.

If the photosensitive layer 41 generates the photocurrent at the portion irradiated with the write beam, an effective voltage of the LCD panel 42 corresponding to the photocurrent may be changed. If a reproduction beam is incident on the LCD panel 42 in a state where the effective voltage of the LCD panel 42 is changed, a phase, amplitude, and the like of the reproduction beam may be modulated.

For example, if the write beam is incident on the photosensitive layer 41 and resistance of the photosensitive layer 41 is reduced, a voltage drop may occur in the LCD panel 42 and a change may occur in a liquid crystal arrangement in the LCD panel 42. Since the change of the liquid crystal arrangement in the LCD panel 42 corresponds to the hologram pattern corresponding to the write beam, the LCD panel 42 may modulate the reproduction beam into a plurality of diffraction beams corresponding to the hologram pattern.

Figure 4:
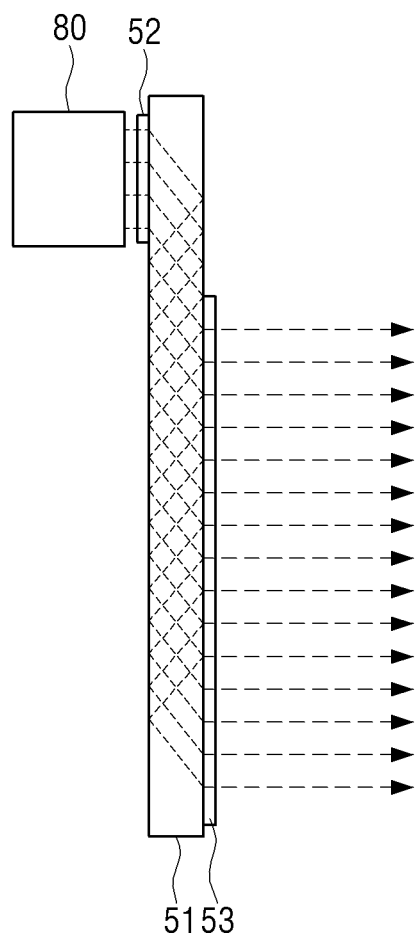
FIG. 4 is a diagram for explaining a configuration of a light guide plate according to an embodiment of the present disclosure.

FIG. 4 is a diagram for explaining a configuration of the light guide plate 50 according to an embodiment of the present disclosure.

Referring to FIG. 4, the light guide plate 50 may include an expander 51, an in-coupling element 52, and an out-coupling element 53.

First, the light guide plate 50 is configured to guide a reproduction beam toward the SLM and may be disposed between the second lens unit 30 and the SLM 40.

If the reproduction beam is incident through the in-coupling element 52, the light guide plate 50 may collimate the reproduction beam into a plurality of parallel beams using the expander 51 and may allow the plurality of parallel beams to be incident uniformly on a rear surface of the SLM 40.

According to an embodiment of the present disclosure, the in-coupling element 52 may control the reproduction beam to be incident on the expander 51 at an incident angle within a predetermined range. On the other hand, the in-coupling element 52 may be implemented as a Bragg grating element or a prism but is not limited thereto. It should be understood that the in-coupling element 52 may be implemented as a holographic grating having a predetermined diffraction pattern or a photopolymer having a periodic refractive index distribution. Various embodiments of the in-coupling element 52 and the expander 51 are described in detail in FIG. 7A.

If the reproduction beam is incident on the expander 51 within a predetermined angle range, the reproduction beam may be totally reflected inside the expander 51. In this case, the reproduction beam may be totally reflected inside the expander 51 without loss repeatedly. On the other hand, the out-coupling element 53 disposed at a front surface of the expander 51 may discharge a part of the reproduction beam outside of the expander 51. In this case, the remaining part of the reproduction beam may be totally reflected in the expander 51. A process of emitting a part of the reproduction beam by the out-coupling element 53 to the outside of the expander 51 and totally reflecting the remaining part of the reproduction beam by the expander 51 is repeatedly performed, and thus the reproduction beam may be uniformly emitted to an entire region of the SLM 40.

When the reproduction beam is emitted to the outside, the out-coupling element 53 may refract and emit the reproduction beam at a predetermined angle to the outside of the expander 51. For example, the out-coupling element 53 may be implemented as a Bragg grating element, and may refract and emit the reproduction beam at a predetermined refractive index based on the following Equation 2, $$n\lambda = 2d \sin(\theta) \quad \text{Equation 2}$$

where n denotes a refractive index of a Bragg grating, $\lambda$ denotes a wavelength of a reproduction beam, and d denotes a distance between Bragg gratings.

The Bragg grating element is configured to have a wavelength selectivity based on Bragg's law ($n\lambda = 2d \sin \theta$), and may refract and emit a reproduction beam having a $\lambda$ wavelength satisfying $n\lambda = 2d \sin \theta$ based on a predetermined angle.

On the other hand, a wavelength l of the write beam and a wavelength $\lambda 2$ of the reproduction beam may be different values. In this case, the Bragg grating may refract and emit only the reproduction beam having the wavelength of $\lambda 2$, and may pass through the write beam having the wavelength of $\lambda 1$ without refraction.

The reproduction beam guided by the light guide plate 50 in a backward direction of the SLM 40 and emitted may be modulated by the SLM 40 into a plurality of diffraction beams corresponding to the hologram pattern.

Figure 5:
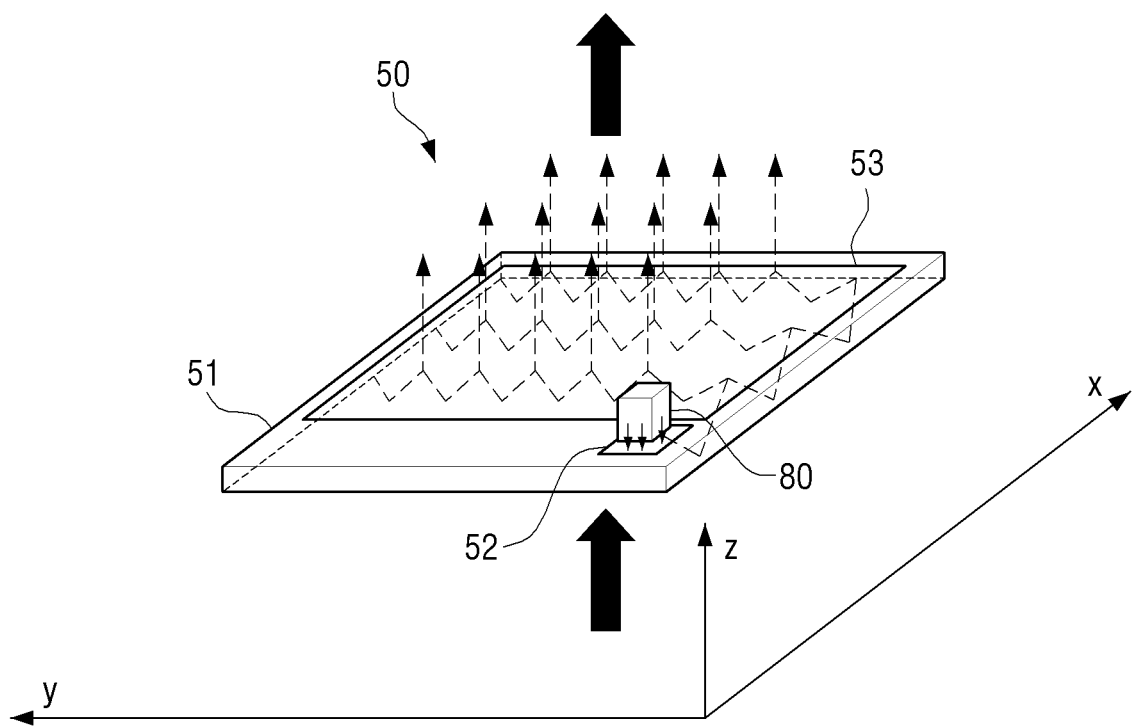
FIGS. 5 and 6 are diagrams for explaining a method in which an out-coupling element emits a reproduction beam and a write beam based on a wavelength according to various embodiments of the present disclosure.
Figure 6:
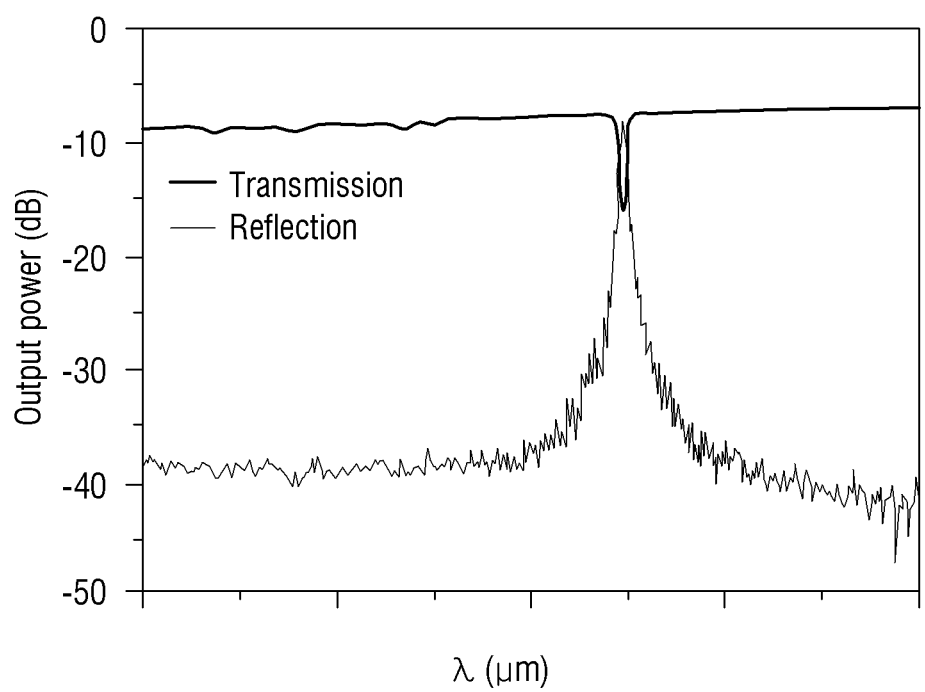

FIGS. 5 and 6 are diagrams for explaining a method in which the out-coupling element 53 emits a reproduction beam and a write beam based on a wavelength according to various embodiments of the present disclosure.

Referring to FIG. 5, the out-coupling element 53 may be implemented as a Bragg grating and disposed at one region of a front surface of the expander 51. The Bragg grating is a configuration having selectivity for wavelength as described above. When the write beam has a wavelength of $\lambda 1$ and $\lambda 1$ belongs to a wavelength passed through without reflection or refraction. Referring to FIG. 6, the write beam may pass through the Bragg grating without reflection or refraction. The write beam that has passed through the Bragg grating may be incident on the SLM 40 to implement a hologram pattern.

When the reproduction beam has a wavelength of $\lambda 2$ and $\lambda 2$ belongs to a wavelength reflected or refracted by the Bragg grating, as shown in FIG. 6, the reproduction beam may be reflected or refracted by the Bragg grating and emitted.

When the reproduction beam is refracted and emitted based on a predetermined angle by the Bragg grating as described above, the reproduction beam may be irradiated to the SLM 40 and modulated into a plurality of diffraction beams. For example, as shown in FIG. 5, the reproduction beam may be emitted perpendicular to the light guide plate 50 and irradiated to the SLM 40, and the SLM 40 may modulate the reproduction beam into the plurality of diffraction beams.

FIGS. 7A to 7D are diagrams for explaining a configuration of the light guide plate 50 according to various embodiments of the present disclosure.

Referring to FIGS. 7A to 7D, if a reproduction beam provider 80 provides the reproduction beam to the in-coupling element 52, the in-coupling element 52 disposed at one side of the expander 51 may control an incident angle of the reproduction beam to fall within a predetermined angle range. Here, the reproduction beam provider 80 may sequentially provide R, G, and B reproduction beams, and accordingly a hologram reproducing apparatus according to an embodiment of the present disclosure may reproduce a color holographic three-dimensional image.

Figure 7A:
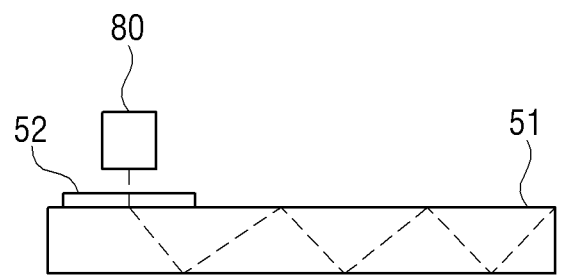
FIGS. 7A, 7B, 7C, and 7D are diagrams for explaining a configuration of a light guide plate according to various embodiments of the present disclosure.

As shown in FIG. 7A, the in-coupling element 52 may be implemented as a Bragg grating element. In this case, as described above, the Bragg grating element may refract the reproduction beam at a predetermined angle to allow the reproduction beam incident on the expander 51, and the reproduction beam incident on the expander 51 may be totally reflected in the expander 51 repeatedly.

Figure 7B:
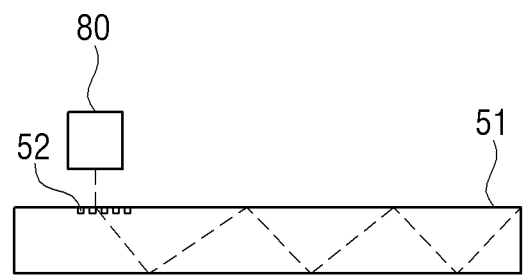

Further, according to another embodiment of the present disclosure, the in-coupling element 52 may be implemented as a holographic grating having a predetermined diffraction pattern or a photopolymer having a periodic refractive index distribution. In this case, as shown in FIG. 7B, the in-coupling element 52 may be disposed at one surface inside the expander 51.

Figure 7C:
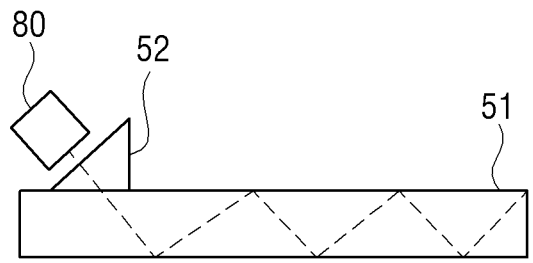

Further, as shown in FIG. 7C, the in-coupling element 52 may be implemented as a prism. The reproduction beam scanned with the prism may be refracted through the prism and incident on the expander 51.

Figure 7D:
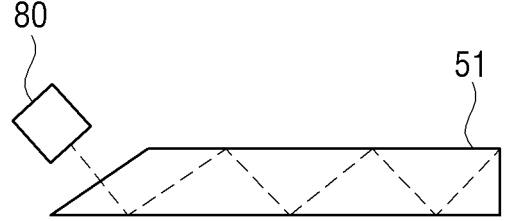

On the other hand, as described above, the light guide plate 50 is not necessarily limited to the configuration including the in-coupling element 52. For example, as shown in FIG. 7D, the light guide plate 50 may not include the in-coupling element 52. In this case, the reproduction beam directly irradiated to one side of the expander 51 may be totally reflected inside the expander 51 repeatedly.

Meanwhile, the light guide plate 50 according to an embodiment of the present disclosure may dispose the out-coupling element 53 inside the expander 51. For example, if the out-coupling element 53 is implemented as a Bragg grating element, the expander 51 may be implemented as an optical fiber including a Bragg grating to perform both functions of the expander 51 and the out-coupling element 53.

Figure 8:
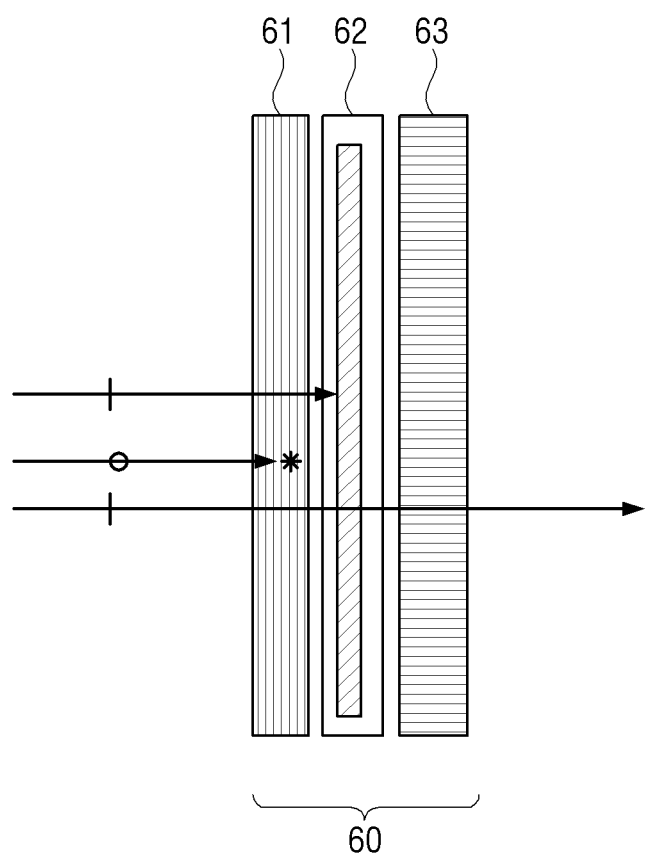
FIG. 8 is a diagram for explaining a configuration of a filter according to an embodiment of the present disclosure.

FIG. 8 is a diagram for explaining a configuration of the filter 60 according to an embodiment of the present disclosure.

Referring to FIG. 8, the filter 60 may perform filtering on a plurality of diffraction beams and a write beam modulated in the SLM 40.

The filter 60 according to an embodiment of the present disclosure may include at least one of a polarizing filter 61, a Bragg grating filter 62, and a louver film 63.

For example, if the filter 60 includes the Bragg grating filter 62, the filter 60 may pass through a +1 order diffraction beam among the plurality of diffraction beams. In this case, the remaining diffraction beams such as a zero order, a −1 order, and the like may be blocked by the filter 60.

Here, the zero order diffraction beam may be a reproduction beam that is not modulated into the diffraction beam in the SLM 40. The Bragg grating filter 62 may pass through the diffraction beam included within a predetermined angle range in relation to the zero order diffraction beam and filter the remaining diffraction beams.

For example, in relation to the zero order diffraction beam, the diffraction beam incident on the Bragg grating filter 62 at an incidence angle of 5 to 10 degrees may pass through, and the remaining diffraction beams may be filtered to prevent crosstalk between the plurality of diffraction beams, deterioration of image quality, etc. It should be noted that an angle range filtered by the Bragg grating filter 62 may be changed according to a viewing area change of a user, a distance between Bragg gratings, a refractive index of a Bragg grating, a wavelength of the reproduction beam, and the like.

When the filter 60 includes the louver film 63 according to another embodiment of the present disclosure, the louver film 63 may perform filtering on the plurality of diffraction beams. Here, the louver film 63 is a film in which a plurality of blind patterns are arranged at regular intervals. Thus, filtering may be performed such that only some of the plurality of diffraction beams passes between the blind patterns. It is needless to say that an interval between the blind patterns may be changed based on the viewing area of the user, a viewing purpose, etc.

Further, according to an embodiment of the present disclosure, the hologram reproducing apparatus may include a first polarizing filter. The first polarizing filter may be disposed between the display 10 and the first lens unit 20 to pass through only a second polarizing light component among a plurality of polarizing light components included in the write beam and reflect the remaining polarizing light components. In this case, the filter 60 disposed between the SLM 40 and the lens 70 may include a second polarizing filter 61 to filter the write beam including only the second polarizing light component.

When the write beam is provided to the viewing area of the user, the reproduction beam may cause damage to user's eyes and may degrade quality of a holographic three-dimensional image. Therefore, the first polarizing filter may perform firstly filtering and the second polarizing filter 61 may perform secondary filtering to prevent the write beam from being provided to the viewing area of the user.

The filter 60 according to an embodiment of the present disclosure includes the polarizing filter 61, the Bragg grating filter 62 and the louver film 63 and performing filtering on the write beam and the plurality of diffraction beams. The write beam may be filtered by the polarization filter 61 and a plurality of filters may be arranged to perform second filtering on the diffraction beam firstly filtered by the Bragg grating filter 62 using the louver film 63. For example, if the zero order and −1 order diffraction beams are refracted by the Bragg grating filter 62, the louver film 63 may filter the refracted diffraction beam to prevent the diffraction beam from being provided to the viewing area of the user.

The diffraction beam that has passed through the filter 60 may be focused onto the viewing area of the user through the lens 70 disposed at the front surface of the filter 60 and reproduced as a three-dimensional holographic image. The lens 70 may be implemented as a fresnel lens, a positive lens, a convex lens, and a field lens as described above and focus the diffraction beam that has passed through the filter 60 onto a spot. If the diffraction beam is focused on the viewing area of the user, the user may view the holographic three-dimensional image.

Figure 9:
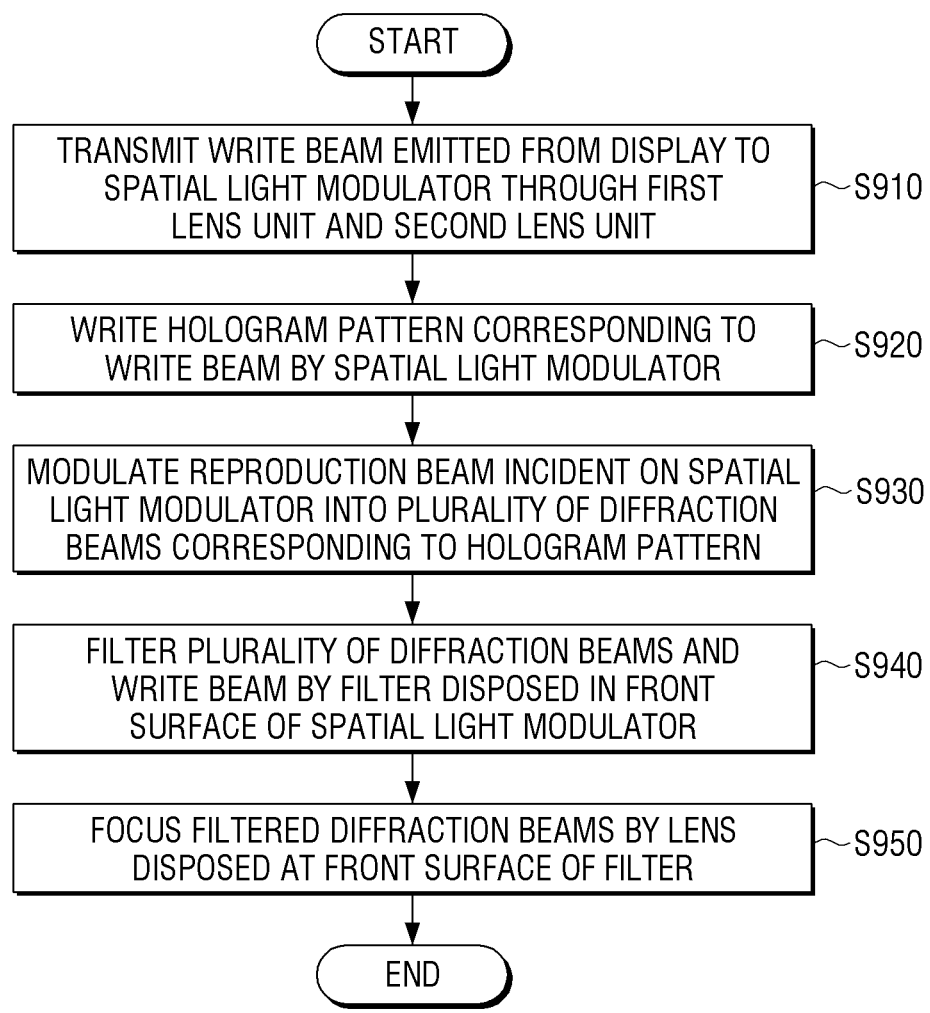
FIG. 9 is a flowchart illustrating a control method according to an embodiment of the present disclosure.

FIG. 9 is a flowchart illustrating a control method according to an embodiment of the present disclosure.

Referring to FIG. 9, a control method of a hologram reproducing apparatus including a display configured to display a hologram pattern and emit a write beam corresponding to the hologram pattern, a first lens unit disposed at a front surface of the display and including at least one lens array including a plurality of first microlenses for firstly focusing the write beam emitted from the display and a second lens unit including at least one lens array including a plurality of second microlenses for secondarily focusing the write beam diffused after being firstly focused transmits the write beam emitted from the display to a SLM through the first lens unit and the second lens unit at operation S910.

Thereafter, a hologram pattern corresponding to the write beam is written by the SLM at operation S920.

Subsequently, a reproduction beam incident on the SLM is modulated into a plurality of diffraction beams corresponding to the hologram pattern at operation S930.

Subsequently, the plurality of diffraction beams and the write beam are filtered by a filter disposed at a front surface of the SLM at operation S940.

The diffraction beam filtered by the lens disposed at a front surface of the filter is focused at operation S950.

Here, the first lens unit may include the first lens array 21 disposed at a front surface of the display and arranged at a first interval from the display, and the second lens array 22 disposed at a front surface of the first lens array 21 and arranged at a second interval from the first lens array 21, the second lens unit may include the third lens array 31 disposed at a front surface of the second lens array 22 and the fourth lens array 32 disposed at a front surface of the third lens array 31 and arranged at the second interval from the third lens array 31, wherein the fourth lens array 32 is arranged at the first interval from the SLM, and wherein the first interval is greater than the second interval.

Further, microlenses included in each of the first and fourth lens arrays 21 and 32 may have a first focal distance (F-distance), and microlenses included in each of the second and third lens arrays 22 and 31 may have a second focal distance, wherein the first focal distance may be greater than twice the second focal distance.

Further, the first interval may have an interval greater than twice the first focal distance, and the second interval may have an interval less than twice the first focal distance.

On the other hand, the SLM may include a photosensitive layer configured to write a hologram pattern according to the write beam, and a LCD panel disposed at a front surface of the photosensitive layer to modulate an incident reproduction beam into a plurality of diffraction beams corresponding to the hologram pattern.

Here, the reproduction beam may be guided toward the SLM by a light guide plate disposed between the second lens unit and the SLM.

Here, the light guide plate may include an expander and an out-coupling element, and the control method may further include collimating the reproduction beam by the expander to make the reproduction beam uniformly incident on a rear surface of the SLM, and refracting the reproduction beam incident on the expander by the out-coupling element disposed at the rear surface of the expander at a predetermined angle and emitting the reproduction beam outside of the expander.

As described above, according to various embodiments of the present disclosure, the hologram reproducing apparatus may be miniaturized and may provide a high-quality holographic image.

Hereinabove, although various embodiments of the present disclosure are separately described, each of the various embodiments does not necessarily need to be solely implemented, but a configuration and an operation of each of the various embodiments may also be implemented to be combined with one or more other various embodiments.

While the present disclosure has been shown and described with reference to various embodiments thereof, it will be understood by those skilled in the art that various changes in form and details may be made therein without departing from the spirit and cope of the present disclosure as defined by the appended claims and their equivalents.

What is claimed is:

1. A hologram reproducing apparatus comprising:
a display configured to display a hologram pattern and emit a write beam corresponding to the hologram pattern;
a reproduction beam provider to emit a reproduction beam;
a first lens unit disposed at a front surface of the display and comprising at least one lens array including a plurality of first microlenses for respectively firstly focusing the write beam emitted from the display;
a second lens unit comprising at least one lens array including a plurality of second microlenses for secondarily focusing the write beam diffused after being firstly focused;
a spatial light modulator (SLM) disposed at a front surface of the second lens unit, configured to write the hologram pattern according to the secondly focused write beam and modulate the reproduction beam into a plurality of diffraction beams corresponding to the hologram pattern if the reproduction beam is incident;
a light guide plate disposed between the second lens unit and the SLM and configured to guide the reproduction beam toward the SLM;
a filter disposed at a front surface of the SLM and configured to filter the plurality of diffraction beams and the write beam; and
a lens configured to focus the plurality of diffraction beams filtered through the filter.

2. The hologram reproducing apparatus as claimed in claim 1,
wherein the first lens unit comprises:
a first lens array disposed at the front surface of the display at a first interval from the display, and
a second lens array disposed at a front surface of the first lens array at a second interval from the first lens array,
wherein the second lens unit comprises:
a third lens array disposed at a front surface of the second lens array, and
a fourth lens array disposed at a front surface of the third lens array at the second interval from the third lens array,
wherein the fourth lens array is arranged at the first interval from the SLM, and
wherein the first interval is greater than the second interval.

3. The hologram reproducing apparatus as claimed in claim 2,
wherein microlenses included in each of the first and fourth lens arrays have a first focal distance,
wherein microlenses included in each of the second and third lens arrays have a second focal distance, and
wherein the first focal distance is greater than twice the second focal distance.

4. The hologram reproducing apparatus as claimed in claim 3,
wherein the first interval has an interval greater than twice the first focal distance, and
wherein the second interval has an interval less than twice the first focal distance.

5. The hologram reproducing apparatus as claimed in claim 1, wherein the SLM comprises:
a photosensitive layer configured to write a hologram pattern according to the write beam; and
a liquid crystal display (LCD) panel disposed at a front surface of the photosensitive layer to modulate the incident reproduction beam into a plurality of diffraction beams corresponding to the hologram pattern.

6. The hologram reproducing apparatus as claimed in claim 1,
wherein the light guide plate distributes the reproduction beam uniformly incident with parallel rays onto a rear surface of the SLM and comprises:
an in-coupling element configured to allow an incidence angle of the reproduction beam incident on the light guide plate to fall within a predetermined angle range, and
wherein the in-coupling element is implemented as a Bragg grating element or a prism.

7. The hologram reproducing apparatus as claimed in claim 1,
wherein the light guide plate distributes the reproduction beam uniformly incident with parallel rays onto a rear surface of the SLM and comprises:
an out-coupling element configured to refract the reproduction beam incident on the light guide plate at a predetermined angle and emit the reproduction beam outside of the light guide plate, and
wherein the out-coupling element is implemented as a Bragg grating element.

8. The hologram reproducing apparatus as claimed in claim 7, wherein the out-coupling element refracts and emits the reproduction beam incident on the light guide plate at the predetermined angle based on an equation, $$n\lambda = 2d \sin(\theta)$$

where n denotes a refractive index of the Bragg grating, $\lambda$ denotes a wavelength of the reproduction beam, and d denotes a lattice separation distance in the Bragg grating.

9. The hologram reproducing apparatus as claimed in claim 1,
wherein the filter comprises a Bragg grating filter,
wherein, if the plurality of diffraction beams are incident, the Bragg grating filter allows a diffraction beam incident within a predetermined angle range to pass through based on a zero order diffraction beam among the plurality of diffraction beams, and
wherein the zero order diffraction beam is a beam in which the reproduction beam is not modulated to a diffraction beam in the SLM.

10. The hologram reproducing apparatus as claimed in claim 9, wherein the filter further comprises a louver film disposed at a front surface of the Bragg grating filter to secondarily filter the diffraction beam firstly filtered through the Bragg grating filter.

11. The hologram reproducing apparatus as claimed in claim 9, further comprising a first polarizing filter disposed between the display and the first lens unit to filter a first polarizing component of the write beam,
wherein the filter further comprises a second polarizing filter configured to filter a second polarizing component of the write beam.

12. The hologram reproducing apparatus as claimed in claim 1, wherein the display is implemented as a self-luminous element that emits the write beam corresponding to the hologram pattern.

13. A control method of a hologram reproducing apparatus comprising a display configured to display a hologram pattern and emit a write beam corresponding to the hologram pattern, a reproduction beam provider to emit a reproduction beam, a first lens unit disposed at a front surface of the display and comprising at least one lens array including a plurality of first microlenses for firstly focusing the write beam emitted from the display, a second lens unit comprising at least one lens array including a plurality of second microlenses for secondarily focusing the write beam diffused after being firstly focused, and a light guide plate disposed between the second lens unit and a spatial light modulator (SLM) and configured to guide the reproduction beam toward the SLM, the control method comprising:
transmitting the write beam emitted from the display to the SLM through the first lens unit and the second lens unit;
writing a hologram pattern corresponding to the write beam by the SLM;
modulating the reproduction beam incident on the SLM into a plurality of diffraction beams corresponding to the hologram pattern;
filtering the plurality of diffraction beams and the write beam by a filter disposed at a front surface of the SLM; and
focusing the filtered plurality of diffraction beams by the lens disposed at a front surface of the filter.

14. The control method as claimed in claim 13,
wherein the first lens unit comprises:
a first lens array disposed at the front surface of the display at a first interval from the display, and
a second lens array disposed at a front surface of the first lens array at a second interval from the first lens array, wherein the second lens unit comprises:
- a third lens array disposed at a front surface of the second lens array, and
- a fourth lens array disposed at a front surface of the third lens array at the second interval from the third lens array, wherein the fourth lens array is arranged at the first interval from the SLM, and wherein the first interval is greater than the second interval.

15. The control method as claimed in claim 14,
wherein microlenses included in each of the first and fourth lens arrays have a first focal distance,
wherein microlenses included in each of the second and third lens arrays have a second focal distance, and
wherein the first focal distance is greater than twice the second focal distance.

16. The control method as claimed in claim 15,
wherein the first interval has an interval greater than twice the first focal distance, and
wherein the second interval has an interval less than twice the first focal distance.

17. The control method as claimed in claim 13, wherein the SLM comprises:
- a photosensitive layer configured to write a hologram pattern according to the write beam; and
- a liquid crystal display (LCD) panel disposed at a front surface of the photosensitive layer to modulate the incident reproduction beam into a plurality of diffraction beams corresponding to the hologram pattern.

18. The control method as claimed in claim 13,
wherein the light guide plate distributes the reproduction beam uniformly incident with parallel rays onto a rear surface of the SLM and comprises an out-coupling element, and
wherein the control method further comprises:
- refracting the reproduction beam incident on the light guide plate by the out-coupling element at a predetermined angle and emitting the reproduction beam outside of the light guide plate.

* * * * *